(12) United States Patent
Moghaddam et al.

(10) Patent No.: US 11,624,034 B2
(45) Date of Patent: Apr. 11, 2023

(54) PROCESS AND APPARATUS FOR PRODUCING SYNTHESIS GAS THROUGH THERMOCHEMICAL CONVERSION OF BIOMASS AND WASTE MATERIALS

(71) Applicant: GIDARA Energy B.V., Nootdorp (NL)

(72) Inventors: Elyas M. Moghaddam, Nootdorp (NL); Avishek Goel, Nootdorp (NL); Dobrin Toporov, Nootdorp (NL); Wim van der Zande, Nootdorp (NL); Chris van der Zande, Nootdorp (NL); Alireza Mohammadi, Nootdorp (NL)

(73) Assignee: GIDARA Energy B.V., Nootdorp (NL)

( * ) Notice: Subject to any disclaimer, the term of this patent is extended or adjusted under 35 U.S.C. 154(b) by 0 days.

(21) Appl. No.: 17/560,376

(22) Filed: Dec. 23, 2021

(65) Prior Publication Data

US 2022/0213398 A1    Jul. 7, 2022

(30) Foreign Application Priority Data

Jan. 6, 2021    (EP) .................................... 21150402

(51) Int. Cl.
*C10J 3/72*    (2006.01)
*C10J 3/46*    (2006.01)
*C10J 3/48*    (2006.01)

(52) U.S. Cl.
CPC .............. *C10J 3/723* (2013.01); *C10J 3/463* (2013.01); *C10J 3/482* (2013.01); *C10J 3/721* (2013.01);
(Continued)

(58) Field of Classification Search
CPC ................ C10J 3/721; C10J 2300/0956; C10J 2300/093; C10J 2300/0946;
(Continued)

(56) References Cited

U.S. PATENT DOCUMENTS 3,375,175 A * 3/1968 Eddinger ................ C10B 49/10
                                                                    201/37
3,565,766 A * 2/1971 Eddinger ................ C10B 55/10
                                                                    201/31
(Continued)

FOREIGN PATENT DOCUMENTS

DE        2949533        6/1981
DE        4340459        5/1995
(Continued)

OTHER PUBLICATIONS

Wolfgang Adlhoch et al: "High-Temperature Winkler Gasification of Municipal Solid Waste," Gasification Technologies Conference, Oct. 8, 2000, pp. 1-15.

(Continued)

*Primary Examiner* — Imran Akram
(74) *Attorney, Agent, or Firm* — Dentons Bingham Greenebaum LLP; Brian W. Chellgren

(57) ABSTRACT

The present invention provides a process and apparatus for converting feedstock comprising biomass and/or carbon-containing solid waste material to synthesis gas. The process comprises supplying the feedstock to a gasifier comprising a fluidized bed zone and a post-gasification zone and contacting the feedstock with a gasification agent at a plurality of different operating temperatures based on the ash softening temperature of the feedstock and finally recovering the synthesis gas. The apparatus is configured to perform the process and comprises a plurality of nozzles arranged at an acute angle relative to a horizontal plane of the gasifier.

14 Claims, 2 Drawing Sheets

(52) U.S. Cl.
CPC .. *C10J 2300/092* (2013.01); *C10J 2300/0959* (2013.01); *C10J 2300/0976* (2013.01); *C10J 2300/12* (2013.01); *C10J 2300/1603* (2013.01); *C10J 2300/1631* (2013.01); *C10J 2300/1838* (2013.01)

(58) Field of Classification Search
CPC ........ C10J 2300/0959; C10J 2300/0976; C10J 2300/0916; C10J 3/723
See application file for complete search history.

(56) References Cited

U.S. PATENT DOCUMENTS

| | | | | |
|---|---|---|---|---|
| 3,804,606 | A * | 4/1974 | Archer | C10J 3/54 60/39.12 |
| 3,817,723 | A * | 6/1974 | Donath | C10J 3/76 208/414 |
| 3,933,883 | A * | 1/1976 | Parthasarathy | B01J 23/755 518/715 |
| 4,303,415 | A * | 12/1981 | Summers | C10J 3/54 48/210 |
| 4,318,713 | A * | 3/1982 | Lee | C10J 3/005 48/209 |
| 4,347,064 | A * | 8/1982 | Reh | C10J 3/721 201/31 |
| 2005/0095183 | A1 * | 5/2005 | Rehmat | C10K 3/006 422/600 |
| 2007/0012229 | A1 * | 1/2007 | Rehmat | F23J 15/006 110/229 |
| 2010/0179232 | A1 * | 7/2010 | Robinson | C10L 3/102 518/703 |
| 2012/0256133 | A1 * | 10/2012 | Apanel | C10K 1/004 252/373 |
| 2013/0239479 | A1 * | 9/2013 | Gao | B01J 8/0055 48/89 |
| 2014/0332724 | A1 * | 11/2014 | Tsangaris | C01B 3/22 422/643 |
| 2015/0299590 | A1 * | 10/2015 | Keeler | C10K 1/04 252/373 |
| 2017/0275542 | A1 * | 9/2017 | Rehmat | C10J 3/723 |
| 2022/0204879 | A1 * | 6/2022 | Daly | C10L 3/103 |

FOREIGN PATENT DOCUMENTS

| | | |
|---|---|---|
| DE | 19548324 | 6/1996 |
| DE | 102017219783 | 5/2019 |
| WO | 2018/095781 | 5/2018 |

OTHER PUBLICATIONS

European Search Report pertaining to EP 21150402.2, filed Jan. 6, 2021, ESR dated Jun. 21, 2021.

* cited by examiner

PROCESS AND APPARATUS FOR PRODUCING SYNTHESIS GAS THROUGH THERMOCHEMICAL CONVERSION OF BIOMASS AND WASTE MATERIALS

CROSS-REFERENCE TO RELATED APPLICATION

This application claims the benefit of and priority to European Application No. 21150402.2, filed Jan. 6, 2021, incorporated herein by reference.

FIELD OF THE INVENTION

The present invention relates to processes and apparatuses for the conversion of feedstock comprising biomass and/or carbon-containing solid waste material to a more useful synthesis gas. In particular, the present invention relates to a multi-step process and apparatus for thermochemical conversion, without requiring the use of any external catalyst, of such feedstock to synthesis gas. The conversion is achieved through contacting the feedstock with at least steam and oxygen in a plurality of steps at different operating temperatures in a controlled and optimized manner to achieve effective conversion to synthesis gas.

BACKGROUND

Waste materials such as municipal solid waste (MSW), agricultural and industrial waste etc. are mainly landfilled and/or incinerated. Currently, waste recycling is gaining more and more attention, since it allows reuse of a large portion of the already used materials, such as paper, some plastics, glass, metals etc. However, other non-recyclable materials are still either dumped into landfills or incinerated in order to recover some of the chemical energy stored in these materials by converting it into electricity and heat. This energy, however, cannot be stored.

There is therefore a need for methods and apparatuses which are able to better process these other non-recyclable materials.

Gasification of biomass and non-recyclable carbon-containing solid waste materials converts waste materials into synthesis gas thus providing the possibility to convert waste into more valuable products, such as chemicals or synthetic fuels. In other words, gasification of waste helps to recycle the waste materials differently to conventional recycling methods by converting the carbon in the waste materials into more useful molecules (i.e., synthesis gas) which can then be synthesised into valuable final products. Overall, gasifying biomass and waste materials can bring the following advantages to communities: (1) the utilization of carbon containing solid waste materials in an environmentally-friendly process, without emissions of toxic substances into the atmosphere (2) providing the most efficient way for converting the chemical energy stored in municipal solid waste (MSW) into electricity and (3) providing the most efficient way for converting the carbon content of MSW, resp. refuse derived fuel (RDF), into a highly valuable product, such as chemicals or synfuels.

Synthesis gas is typically a fuel gas mixture consisting primarily of hydrogen, carbon monoxide, and very often some carbon dioxide. It is commonly used as an intermediate in creating synthetic natural gas and for producing ammonia or methanol. Synthesis gas (syngas) may be produced by thermochemical conversion of carbon containing sourced materials, such as forest residues, agricultural residues, industrial and urban waste, etc. In general, the gasification of such carbon containing sourced materials provide raw synthesis gas which may include several impurities such as sulfur compounds (mainly hydrogen sulfide, $H_2S$ and carbonyl sulfide, COS), ammonia, chlorine compounds (mainly HCl), volatile matters, lower and high molecular weight tars and fines (mainly in the form of micron and sub-micron fly-ash containing metal salts), and char particles (carbon contained particulates typically above 500 microns). It is desirable to be able to convert, in an efficient process and apparatus, biomass and other carbon-containing solid waste materials into more useful synthesis gas products which can then be used to produce high valuable materials, such as methanol, synthetic natural gas and/or Fischer-Tropsch synthesis fuels.

Various approaches have been devised for producing, purifying, and modifying raw synthesis gas from carbonaceous materials. These existing approaches are briefly discussed below.

U.S. Pat. No. 6,063,355 discloses a method for treating waste through two successive fluidized bed and combustion reactors. The solidified and/or slurry waste is introduced to the fluidized bed with revolving flow pattern at a temperature ranging from 450° C. to 650° C., thereby producing gaseous and carbonaceous materials. These products are directly fed to a swirling flow combustion reactor, which is separate from the fluidized bed reactor, and increasing the temperature to at least 1300° C. to produce synthesis gas. The crude syngas produced in the second reactor is then quenched to separate the slag and the quenched crude syngas is passed through a cyclone and scrubber for further cleaning. This method involves the use of two successive fluidized beds which results in higher capital and operational costs.

DE 4317319 A1 discloses a gasification-based technology to produce crude synthesis gas which is further conditioned and used as a feed for alternative end-products such as methanol, cleaned synthesis gas and hydrogen. The shredded wastes are fed to two parallel connected fixed bed gasifiers wherein the feed is reacted with oxygen, steam and raw carbon dioxide at temperatures up to 1200° C. The produced crude synthesis gas is partly sent to an entrained-flow gasifier at a temperature of 1400° C. and pressure of 26 bar (2600 kPa) and partly to a facility consisting of washing, heat recovery and cooling stages, followed by a two-stage gas scrubbing unit, COS hydrolysis and lastly used for power generation. The produced crude synthesis gas from the entrained-flow gasifier is further processed in a soot wash unit, followed by CO conversion, gas cooling and scrubbing units and finally used for producing methanol. Again, the use of two parallel fixed bed gasifiers and one entrained flow gasifier results in higher capital and operational costs.

EP 2376607 B1 discloses a method for producing and treating crude syngas from biomass through a three-step gasification and reforming process at pressure lower than 10 atm (1013 kPa). The solid biomass is fed to the bottom section, described as a gasification zone, of a fluidized bed reactor in the presence of oxygen and steam, wherein the temperature lies within the range of 500° C. to 750° C. (in the first step). The portion of said oxidized biomass produced in the first step is directly treated in a freeboard region with a residence time lower than 8 s in the presence of oxygen and steam at temperatures ranging from 800° C. to 850° C. (in the second step). The portion of said oxidized biomass produced in the second step is then treated in a separate thermal reformer with oxidizing gas comprising oxygen and steam at a temperature of at least 900° C. and not exceeding a maximum of 1000° C. to produce crude syngas (in the third step). The crude syngas produced in the thermal reformer is then passed through a cyclone, followed by a heat recovery unit and finally scrubbers for further cleaning. This method has a number of disadvantages, such as:

- the third step takes place in a separated thermal reformer apparatus which means that an additional reactor is required, leading to higher capital and operational costs;
- the method is restricted to the operating pressure of the gasifier, which is below 10 atm (1013 kPa). This results in larger gasifier unit sizes being required when processing larger quantities of feedstock;
- due to shorter residence times in the post-gasification zone, heavier hydrocarbons are not completely decomposed and therefore a subsequent separate thermal reforming unit is required (as mentioned above); and
- the reliance on using external catalysts and bed material for gasification increases the operational costs of the system.

US 2005/0039400 A1 discloses a method and apparatus for producing substantially pure hydrogen from carbonaceous materials using a hydrogen-selective permeation membrane incorporated into two successive gasification and/or gas-phase reactors. The carbonaceous feedstock is fed to a membrane gasifier wherein the gasification agents are introduced from the bottom of the reactor, providing fluidization and reaction within the system, working at temperatures typically in a range of 700° C. to 2000° C. and pressures in a range of 1 to 200 atm (101 to 20265 kPa). The produced crude syngas is contacted with a special permeable hydrogen selective membrane to separate pure hydrogen from the retentate. The effluent syngas from the gasifier is passed through a successive fuel reforming process in a shift reactor equipped with hydrogen-selective permeation membrane, in which substantially pure hydrogen is produced and separated from the crude syngas. The retentate crude syngas is further treated and cleaned in a gas cleaning and $CO_2$ removal unit. This process requires very high operating temperatures up to 2000° C. and very high operating pressures of up to 200 atm (20265 kPa), which increases the total capital cost and operating costs. Incorporating membranes into the reactors can also cause problems during operation such as clogging of membranes due to the high ash content of produced crude synthesis gas. Using membranes in the gasifier also imposes considerable maintenance services during operation leading to a higher operational cost.

DE 10 2017 219 783 A1 discloses a HTW gasifier device.

DE 195 48 324 A1 discloses a process for the gasification of carbonaceous solid materials.

WO 2018 095 781 A1 relates to a system for converting carbon-containing fuels into synthesis gas.

DE 2 949 533 A1 is concerned with a solid fuel fluidized bed reactor with a uniform temperature in a secondary reaction zone above the bed by spaced reagent injection.

There therefore exists a need for processes and apparatuses which are able to convert feedstock comprising biomass and/or carbon-containing solid waste material to synthesis gas in a more efficient, convenient and cost-effective manner.

In this respect, it has been discovered by the inventors of the present invention that the principles of High Temperature Winkler (HTW) technologies can be adapted in order to provide a process and apparatus that efficiently converts biomass and/or carbon-containing solid waste material into synthesis gas. HTW gasification is a long established method performed at elevated pressures and can be described as a pressure-loaded fluidized bed gasification process. The HTW method was used originally for a broad range of applications but, up until now, there have been difficulties in developing existing HTW technologies in order to efficiently convert biomass and/or carbon-containing solid waste materials into synthesis gas.

SUMMARY

In an aspect of the invention, there is provided a process for converting feedstock comprising biomass and/or carbon-containing solid waste material to synthesis gas, the process comprising the following steps:

(a) supplying the feedstock to a gasifier, the gasifier comprising a fluidized bed zone and a post-gasification zone;

(b) contacting the feedstock with a gasification agent comprising steam and oxygen in the fluidized bed zone, at an average temperature of between about 350-400° C. below the ash softening temperature of the feedstock, to partially oxidize the feedstock;

(c) contacting at least a portion of the partially oxidized product produced in step (b) with a gasification agent comprising steam and oxygen in the fluidized bed zone, at a higher average temperature than in step (b), the average temperature being between about 250-350° C. below the ash softening temperature of the feedstock;

(d) contacting at least a portion of the product produced in step (c) with a gasification agent comprising steam and oxygen in the post-gasification zone, at a higher average temperature than in step (c), the average temperature being between about 200-300° C. below the ash softening temperature of the feedstock;

(e) contacting at least a portion of the product produced in step (d) with a gasification agent comprising steam and oxygen in the post-gasification zone, at a higher average temperature than in step (d), the average temperature being between about 150-250° C. below the ash softening temperature of the feedstock, to produce the synthesis gas; and (f) recovering the synthesis gas from the product produced in step (e).

The process according to the invention provides a simple, relatively low cost and efficient way of converting feedstock comprising biomass and/or carbon-containing solid waste material to synthesis gas. The use of a single gasifier comprising both a fluidized bed zone and post-gasification zone greatly simplifies the process compared with those prior art processes that rely on the use of multiple units e.g., a reactor and a complimentary reformer/combustor. It has also been found that the above operating temperatures provides effective conversion of the feedstock to syngas and also allows flexibility in terms of the other operating conditions in the gasifier, such as pressure. In particular, the present process permits the use of higher pressures, up to approximately 3000 kPa, which allows the use of small size units and more compacted units for higher product capacity. Furthermore, higher gasification pressures are favourable for the downstream processes, such as synthesis of methanol, synthetic natural gas or ammonia from the produced syngas—which all require high pressures. Thus, less energy is required to operate the downstream processes due to the higher pressures of the raw syngas from the gasifier. The process steps can also be conveniently controlled along the fluidized bed and post-gasification zones, allowing optimisation of conditions depending on the characteristics of the feedstock.

In an embodiment, the process further comprises a step of cooling at least a portion of the product produced in step (e) to an average temperature lower than in step (e), the average temperature being no greater than about 200° C. below the ash softening temperature of the carbonaceous feedstock, wherein this step takes place in the post-gasification zone.

In an embodiment, the cooling step takes place in a quench subzone, in particular at the upper part, of the post-gasification zone and the step of cooling is performed using quench water or process condensate.

The above two embodiments quench the raw syngas, thus freezing or quenching sticky particles that were formed in the higher temperatures of the process, and thereby minimize the relevant problems mainly including clogging in downstream process equipment, which thus increases the gasifier availability. Thus, due to a high temperature and the possibility of melting the inorganic material in the entrained char such as alkali chloride and metal oxides, the raw syngas is subjected to the quench subzone so as to minimize the agglomeration problems or deposition of melted materials on the walls in the post-gasification region and downstream units such as the cyclone and raw gas cooler.

In an embodiment, the process further comprises a step of removing at least a portion of a bottom product, optionally a heavy solid residue, produced in step (b) to a sedimentation subzone in the fluidized bed zone.

In an embodiment, the process further comprises treating the bottom product in the sedimentation subzone with a gasification agent comprising steam and/or $CO_2$, optionally wherein the treatment is carried out at an average temperature lower than in step (b), the average temperature being not greater than about 400° C. below the ash softening temperature of the feedstock. The use of steam and/or $CO_2$ in the sedimentation subzone helps to fluidize the bed material around any gasification agent entry points in the lower regions of the fluidized bed zone in order to avoid hot spots and channels developing in-front of these entry points.

In an embodiment, step (f) comprises feeding at least a portion of the synthesis gas to a cyclone and separating the produced synthesis gas from entrained particulate material, optionally fly-ash or char, and recycling at least a portion of the particulate material back to step (b) in the fluidized bed zone.

In a certain embodiment, the residence time in the fluidized bed zone is at least about 8 minutes and the residence time in the post-gasification zone is at least about 7 seconds.

In one embodiment, the residence time of raw synthesis gas in the post-gasification zone is at least about 7 seconds. A residence time, of e.g. raw synthesis gas, of at least about 7 seconds in the post-gasification zone improves the thermal decomposition of the heavier hydrocarbons including tars. The process can therefore advantageously produce tar-free synthesis gas.

In an embodiment, the process comprises providing the gasification agents through a plurality of nozzles, optionally tuyeres, wherein the nozzles are arranged at an acute angle relative to a horizontal plane of the gasifier.

In an embodiment, the process further comprises operating the gasifier at a pressure of about 1000 kPa to 3000 kPa, optionally wherein the gasifier is a refractory lined reactor.

In an embodiment, the process further comprises operating the gasifier without adding external bed material and catalyst. The process can operate without requiring the addition of external catalyst. This is beneficial in reducing operating costs and making the process simpler to operate because added external catalyst can get poisoned quickly (in particular from impurities present in the feedstock) as well as being difficult to handle and reuse.

In an embodiment, the process further comprises supplying the gasification agent to the gasifier so that the oxygen content in the gasifier is in the controlled range of 0.28-0.52 $Nm^3/kg$ (daf) of the feedstock, of which at least about 20% and not greater than about 80% is supplied to the fluidized bed zone and so that the amount of steam in the gasifier is in the controlled range of 0.23-0.52 $Nm^3/kg$ (daf) of the feedstock, of which at least about 40% and not greater than about 80% is supplied to the fluidized bed zone.

In an embodiment, the supplied feedstock is a pelletized feedstock, optionally further comprising pressurizing the pelletized feedstock in a pressurisation system prior to supplying the feedstock to the fluidized bed zone in step (b). The use of a pelletized feedstock is favourable at elevated pressures and also provides a feedstock with higher carbon density than shredded or non-pelletized material.

In an embodiment, the post-gasification zone is arranged in the gasifier above the fluidized bed zone, wherein the fluidized bed zone is in a conical portion of the gasifier.

In an embodiment, the process further comprises performing each of steps (b) to (e) in substantially separate subzones within the gasifier.

Also disclosed herein is an apparatus for performing the process according to the previous aspect or any of the embodiments above, wherein the apparatus comprises a gasifier, wherein the gasifier comprises a fluidized bed zone and a post-gasification zone; and a plurality of nozzles, optionally tuyeres, within the gasifier, wherein at least one of the nozzles is arranged at an acute angle relative to a horizontal plane of the gasifier and wherein the plurality of nozzles are configured to supply in use the gasification agent so as to generate both the required fluidisation inside the fluidized bed zone and the plurality of operating temperatures within the fluidized bed and post-gasification zones of the gasifier.

The use of such nozzles enhances localized transport and reaction mechanisms along the gasifier. In particular, the nozzle arrangement helps to optimise conditions within the gasifier by enhancing the cracking of undesirable high molecular weight hydrocarbons such as heterocyclic compounds, aromatic compounds and light and heavy polycyclic aromatic compounds—as compared with typical nozzles which are arranged in a horizontal plane of the gasifier and typically inject the gasification agent along a substantially horizontal plane into the gasifier. The hereinabove mentioned high molecular weight hydrocarbons are undesirable in the product synthesis gas and thus the quality of the synthesis gas product is improved.

Also provided herein as examples useful for understanding the invention is:

a process for converting feedstock comprising biomass and/or carbon-containing solid waste material to synthesis gas, the process comprising supplying the feedstock to a gasifier, the gasifier comprising a fluidized bed zone and a post-gasification zone and contacting the feedstock with a gasification agent comprising steam and oxygen in the fluidized bed and post-gasification zones, to produce synthesis gas; wherein the process further comprises any of the following features on their own or in any combination:

wherein the supplied feedstock is a pelletized feedstock, optionally further comprising pressurizing the pelletized feedstock in a pressurisation system prior to supplying the feedstock to the fluidized bed zone in step (b); and/or providing the gasification agents through a plurality of nozzles, optionally tuyeres, wherein at least one of the nozzles is arranged at an acute angle relative to a horizontal plane of the gasifier, further optionally wherein the nozzles are multilayered; and/or further comprising operating the gasifier at a pressure of about 1000 kPa to 3000 kPa, optionally wherein the gasifier is a refractory lined reactor; and/or wherein the residence time, e.g. of raw synthesis gas, in the post-gasification zone is at least about 7 seconds.

Also provided herein as an example useful for understanding the invention is an apparatus for converting feedstock comprising biomass and/or carbon-containing solid waste material to synthesis gas, the apparatus comprising any one or more of the following:

means for supplying the feedstock to a gasifier;

a gasifier comprising a fluidized bed zone and a post-gasification zone;

at least one nozzle, for supplying a gasification agent to the gasifier, arranged at an acute angle relative to a horizontal plane of the gasifier, optionally a plurality of nozzles arranged as such;

a plurality of nozzles, for introducing gasification agent to the gasifier, arranged so as to generate in use a plurality of temperature subzones within the gasifier, optionally wherein the plurality of nozzles are arranged along the sides of the gasifier;

a plurality of nozzles, for introducing gasification agent to the gasifier, arranged so as to generate fluidization within the fluidized bed zone of the gasifier; and/or means for recovering the syngas downstream of the gasifier.

BRIEF DESCRIPTION OF THE DRAWINGS

Certain embodiments of the present invention are shown in the accompanying drawing and hereinafter described in detail.

DETAILED DESCRIPTION

Processes and apparatuses for the conversion of feedstock comprising biomass and/or carbon-containing solid waste material to synthesis gas are provided herein and in accordance with the present claimed invention to resolve the foregoing problems in prior art processes and apparatuses.

Figure 1:
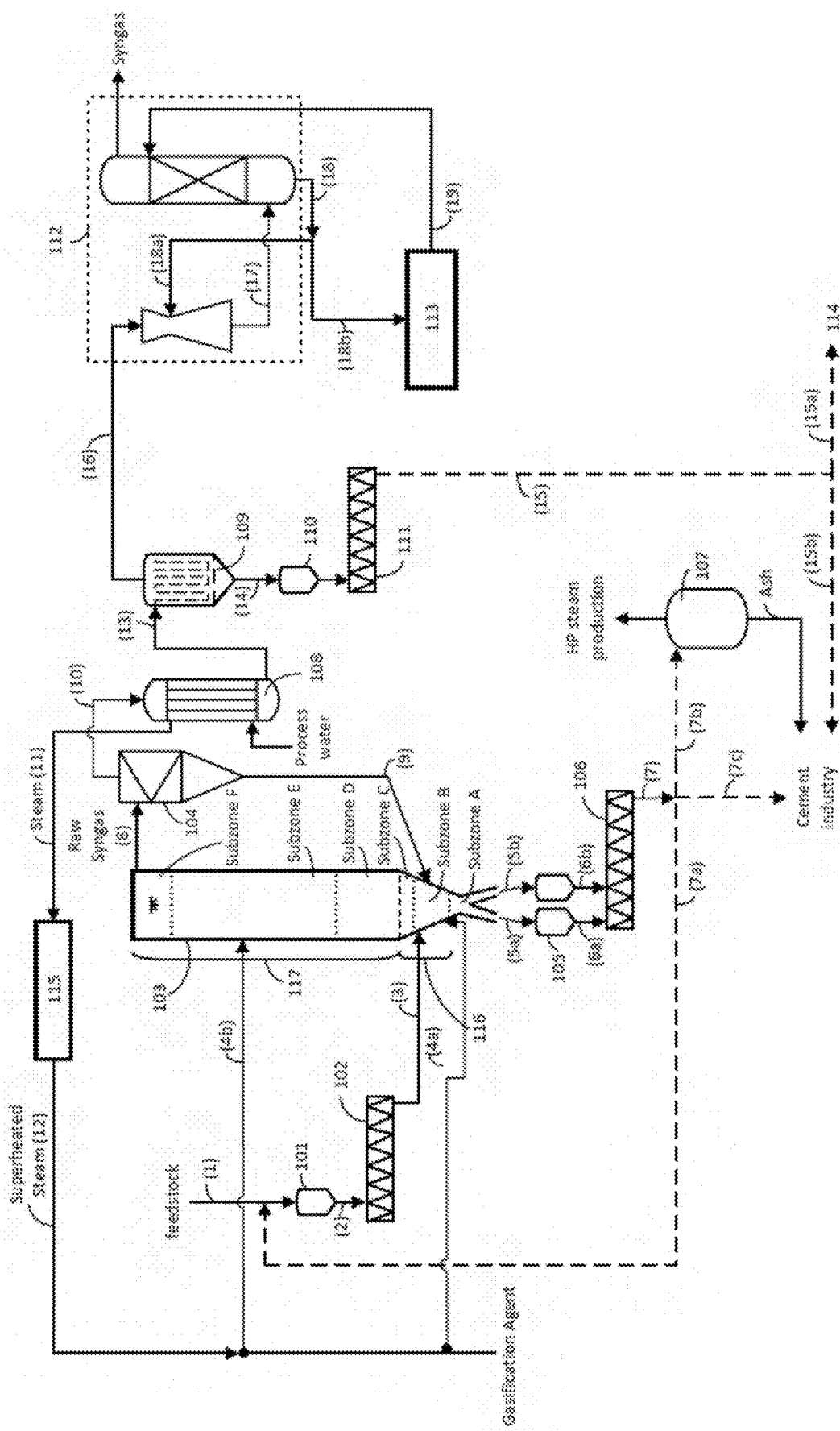
FIG. 1 shows an example process and apparatus arrangement for converting feedstock comprising biomass and/or carbon-containing solid waste material to synthesis gas according to an embodiment of the invention.

An embodiment of the process and apparatus of the present invention is shown in FIG. 1.

In FIG. 1, a pelletized biomass and/or carbon-containing solid waste material feedstock is fed into the system via line 1, through lock hopper system 101 and via line 2 to feed screw conveyer 102 at elevated pressures through line 3 into a lower section of the fluidized bed zone 116 of gasifier 103. Gasifier 103 has a fluidized bed zone 116 and a post-gasification zone 117 above (downstream from) the fluidized bed zone 116. Subzones A, B and C are within the fluidized bed zone 116, while subzones D, E and F are within the post-gasification zone 117. The pelletized feedstock is introduced into the gasifier at subzone B, the so-called solid entry fluidized bed zone, in FIG. 1.

Gasification agent comprising steam and oxygen (and also optionally carbon dioxide) is fed to gasifier 103 through line 4a. In FIG. 1, it is shown that the gasification agent is introduced into the gasifier 103 via the fluidized bed zone 116, although in reality the gasification agent will be introduced at various different points along the gasifier 103, as will be explained later on in more detail.

Although not shown in FIG. 1, the gasification agent is introduced into the gasifier 103 via controlled flowrate through specialized multilayered nozzles. The form and amount of gasification agent introduced into the gasifier 103 will depend on the properties of the feedstock to be gasified. Typically the gasification agent is supplied to the gasifier so that the oxygen content in the gasifier is in the controlled range of 0.28-0.52 $Nm^3$/kg (daf) of the feedstock, of which at least about 20% and not greater than about 80% is supplied to the fluidized bed zone. In further embodiments, the gasification agent is supplied to the gasifier so that the oxygen content in the gasifier is in the controlled range of 0.35-0.45 $Nm^3$/kg (daf) of the feedstock, of which at least about 35% and not greater than about 65% is supplied to the fluidized bed zone. The temperature of the subzones is dependent on the ash softening temperature of the feedstock. The temperature of each subzone is achieved through the content, properties and amount of gasification agent (comprising at least oxygen and steam) added to the gasifier. An external heat source does not need to be used and in preferred embodiments is not used.

The feedstock is treated through the fluidized bed zone 116 and post-gasification zone 117 of the gasifier 103 by travelling and being treated through subzones B, C, D, E and F (with the bottom product being treated in subzone A and instead leaving via the bottom of the gasifier) before leaving the gasifier as a raw syngas product via line 8.

In subzone B, termed here as the solid entry fluidized bed zone, the pelletized feedstock is partially oxidized by the gasification agent comprising oxygen and steam. The gasification agent supply is controlled such that the average temperature of subzone B is within the range of 350-400° C. below the ash softening temperature of the pelletized feedstock. Prior to carrying out the process the ash softening temperature of the pelletized feedstock is calculated and the supply of the gasification agent throughout the gasifier adjusted accordingly.

In subzone B of the fluidized bed zone 116, some of the feedstock in contact with hot fluid bed particles heats up and due to thermal expansion and physical abrasion decomposes on small pieces that after contacting the gasification agents decompose thermally, going through drying, pyrolysis and char-oxidation processes thereby producing heavy moderate-to-low carbon content residue that accumulates in subzone A of the fluidized bed zone 116 i.e., the sedimentation subzone. The average temperature in subzone A (the sedimentation zone) is lower than the average temperature in subzone B and is between 400-500° C. below the ash softening temperature of the feedstock. In the sedimentation subzone the bottoms product is treated with a gasification agent comprising steam (and $CO_2$).

In subzone A, heavy solid carbonaceous residue settles down and leaves the gasifier via the bottom of the fluidized bed zone (through lines 5a and 5b). A basic fluidization agent, normally inert gas, is injected at the bottom of subzone A, providing a fluidization velocity ranging from 0.5 to 1.6 m/s depending on the bottom product physical properties. Via lines 5a and 5b, the heavy residue is processed through lock hoppers 105, and then via lines 6a and 6b to bottom product removal unit 106 before leaving via line 7c to be used in the cement industry or via line 7b to auxiliary boiler 107, wherein high pressure steam is produced and the residual ash generated can be used in the cement industry.

In subzone B, a partially oxidized produced gas containing low and high molecular weight hydrocarbons in the form of volatiles and heterocyclic compounds (e.g., phenol, cresol, quinoline, pyridine), together with light aromatic compounds (e.g., toluene, xylems, ethyl benzene), and light polyaromatic hydrocarbons (e.g., naphthalene, indene, biphenyl, anthracene), along with unreacted parts of the gasification agent, rises from subzone B to the upper most subzone of the fluidized bed zone 116, subzone C, termed here as the highly fluidized bed subzone.

Again, the supply of gasification agent to subzone C is controlled by properties of the pelletized feedstock and the oxygen and steam gasification agent is supplied such that the average temperature in subzone C is higher than in subzone B and 250-350° C. below the ash softening temperature of the feedstock. This condition provides an optimum temperature gradient along the reactor in the highly fluidized bed zone (subzone C) in which the produced gas from subzone B, in the form of heavy fly char loaded gas bubbles, is further decomposed and transformed thermally into a raw product gas with a higher fraction of lower molecular weight hydrocarbons.

In the fluidized bed zone 116, the pelletized carbon containing feedstock and the generated carbon content residue is contacted with fluidization agent for a time period of at least 8 minutes to ensure a high degree of completion for partial oxidation and homogenous and heterogenous thermal decomposition reactions.

The pelletized carbon containing feedstock in the fluidized bed zone 116 gets partially oxidized and thermally decomposed to produce carbon monoxide and hydrogen, and volatiles of majorly lower molecular weight hydrocarbons together with intermediate species in the form of heterocyclic compounds, light aromatics, light polyaromatic hydrocarbons, unreacted part of the gasification agent, and entrained fly ash/char particles and then passes to the post-gasification zone 117 of the gasifier 103. The fly ash/char particles, still contain high carbon concentration have inorganic materials, such as alkali chlorides, metal oxides, etc. in the form salts. Fly ash/char particles are usually less than 200 microns in size, and therefore rise to the post-gasification zone 117. In the post-gasification zone 117, the partially oxidized material is contacted with gasification agent containing oxygen and steam (and sometimes $CO_2$) for a period of at least 7 s through three successive thermal subzones which are elaborated hereafter.

The thermochemically transformed material from the fluidized bed zone 116 enters the post-gasification zone 117 through subzone D, termed here as, heavily loaded solid fly ash/char subzone, wherein the temperature is adjusted through a controlled supply of gasification agent of steam and oxygen such that the average temperature is higher than in subzone C and is 200-300° C. below the ash softening temperature of the feedstock. In subzone D, the carbon present in the fly char is further converted thermochemically in the presence of steam, $CO_2$ and oxygen thereby achieving a high carbon conversion efficiency. In parallel, the intermediate gaseous hydrocarbons produced in subzone C undergo cracking into simpler molecules such as carbon monoxide and hydrogen.

The reformed and oxidized raw gas then enters subzone E in the post-gasification zone 117, termed here as, low fly ash loaded subzone, where the steam and oxygen gasification agent supply is controlled such that the average temperature of subzone E is higher than in subzone D and 150-250° C. below the ash softening temperature of the feedstock. Subzone E is characterized by further conversion of carbon present in the char particles and even further decomposition of intermediate hydrocarbons and tars present in the form of heterocyclic compounds, light aromatics, and light polyaromatic hydrocarbons. High temperatures in low fly ash loaded subzone (subzone E) allows for even better carbon conversion efficiency due to enhanced gasification reactions which improves the carbon conversion.

The raw syngas product from subzone E is passed through the topmost section of the gasifier, subzone F, termed here a quench subzone. This subzone is still within the post-gasification zone 117 of the gasifier 103. In subzone F, the raw syngas is treated at an average temperature of about 200° C. to 250° C. below the ash softening temperature of the feedstock and at an average temperature lower than in subzone E. In this subzone, the raw syngas is cooled using quench water or process condensate, which is sufficient to lower the average temperature below the ash softening point. This quenches the raw syngas thus freezing or quenching sticky particles formed in the higher temperatures and helps to minimize agglomeration problems or deposition of melted materials on the walls in the post-gasification zone 117 and downstream units such as the cyclone 104 and the raw gas cooler (108).

The cooled raw syngas is then withdrawn from the gasifier 103 through line 8 and passed through a cyclone 104, in which approximately >95% of the entrained dust is separated and recycled back through line 9 to the fluidized bed zone 116 of the gasifier 103. In general, recycling such particles which comprise of inorganic compounds coated with carbon can improve the overall carbon conversion efficiency by increasing the residence time of the fly ash/char particles in the gasifier.

The tar free syngas is withdrawn from cyclone 104 via line 10 and passes through raw gas cooler 108 to produce saturated steam. Part of the steam can be re-used in the process by going via line 11 to superheater 115 and the superheated steam recycled to the gasifier 103 via line 12. The cooled syngas with a minimum temperature of 250° C. is subjected to further processing, enhancement, and purification including filtering in the fly-char dry based removal unit 109 through line 13, wherein the dust with the particle size greater than 5 microns is filtered and as a by-product can be sent to either feedstock pelletizing unit 114 (through line 15a) or the cement industry (through line 15b) via lock hopper 110 and dust removal unit 111. Through line 16 to quench and scrubbing unit 112 (including lines, 17, 18, 18a and 19) where (a) the tar free syngas is saturated which is a favourable condition for downstream processing, e.g. CO shift and COS hydrolysis, and (b) the impurities such as hydrogen chloride are absorbed in alkali solution, while other impurities including $H_2S$, COS, $NH_3$, HCN, etc. are partially eliminated by adjusting the pH of the alkali solution. The sour water from the quench and scrubbing unit 112 is sent to the waste-water treatment unit 113 (through line 18b) for further stripping and treatment. The final syngas product is then obtained from the quench and scrubbing unit 112.

The gasification agent is introduced into the gasifier at various entry points throughout the fluidized bed zone 116 and the post-gasification zone 117. The optimized conditions throughout the gasifier are aided through the use of specialized, multilayered nozzles (not shown in FIG. 1) that introduce the gasification agent into the gasifier at an acute angle relative to a horizontal plane. The gasification agent is supplied in sufficient quantity and content to partially oxidize and thermochemically decompose the pelletized feedstock to high quality, tar free syngas. As will be understood by the person skilled in the art, the conditions within the gasifier may also be further optimized based on thermochemical properties of the pelletized feedstock, such as fixed carbon content, heating value, metal content and other impurity levels etc.

Figure 2:
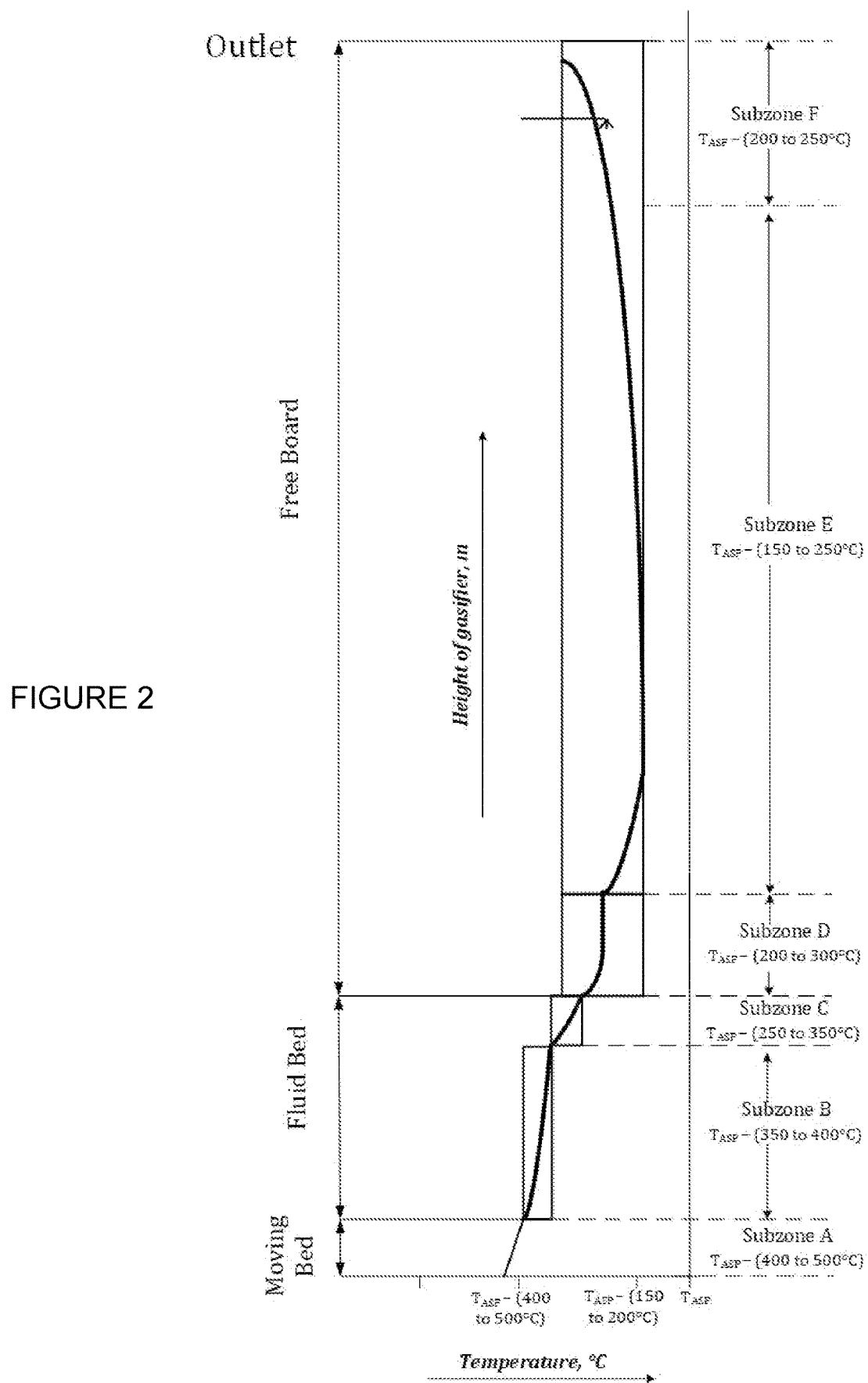
FIG. 2 shows an exemplary temperature profile in an apparatus arrangement such as shown in FIG. 1 when carrying out a process according to the present invention.

The temperature profile shown in FIG. 2 is in accordance with the temperatures used in the process according to the present invention. The temperature profile of FIG. 2 is usually used when operating a gasifier 103 shown in FIG. 1. The symbol "$T_{ASP}$" used in FIG. 2 denotes the temperature at the ash softening point. Therefore, subzone A of FIG. 2 corresponds to subzone A of FIG. 1. In subzone A of FIG. 2, the heavy, ash-containing particles accumulate in the lower part of the fluidized bed before they leave the gasifier 103, and are discharged as a bottom product. Subzone A is used to form a bottom product with low carbon content, which is important to achieve sufficient carbon conversion in the gasifier 103. The temperatures in this area can be in the range of 400° C. to 500° C. below the ash softening temperature of the feedstock, because the injected gas in this area is usually only steam, $CO_2$ or recycled syngas. To avoid local ash softening, no oxygen-containing gasifying agent is usually added to this slightly fluidized zone. The average temperature of 400° C. to 500° C. below the ash softening temperature of the feedstock results from a constant exchange of solids with the hotter parts of the fluidized bed above this subzone.

Subzone B of FIG. 2 is the area where the feedstock is introduced into the gasifier 103. The average temperature in subzone B is higher than in subzone A and in the range between 350° C. to 400° C. below the ash softening temperature of the feedstock, in order to decompose the higher hydrocarbons that are released during the drying and the pyrolysis of the feedstock as soon as possible. In this already well-fluidized zone of the fluidized bed, the first oxygen-containing gasifying agent is added.

In subzone C of FIG. 2, the upper part of the fluidized bed is very well fluidized due to the raw gas produced inside the fluidized bed and due to the higher fraction of fine particles. This subzone is characterized with a higher amount of oxygen (gasification agent) supplied through nozzles that are located in the post-gasification zone 117, but directed downwards to the fluidized bed. The average temperature in this subzone is higher than in subzone B and around 250° C. to 350° C. below the ash softening temperature of the feedstock.

Subzone D of FIG. 2 begins directly above the fluidized bed. It has a wide range of solid particles, which are ejected from the fluidized bed and partly fall back into the fluidized bed. A further oxygen supply (e.g. by a nozzle) in this subzone D is carried out which achieves a high carbon conversion. The average temperature is higher than in subzone C and 200° C. to 300° C. below the ash softening temperature of the feedstock.

Subzone E of FIG. 2 represents gasification zone with low solids content. Due to the significantly lower solids content and through additional oxygen supply (e.g. by a nozzle) at the lower part of this subzone, the temperatures in this area rise up to an average temperature being higher than in subzone D and which is between 150° C. and 250° C. below the ash softening temperature of the feedstock, which leads to a further carbon conversion that takes place. According to the Boudouard equilibrium, the higher temperatures in this zone allow to achieve higher amounts of CO formed in the raw gas thus improve the syngas yield. Additionally, unwanted hydrocarbon components, such as methane, benzene and naphthalene, in the raw gas can be significantly reduced. Further, due to the endothermic gasification reactions, the average temperature of raw syngas and of the entrained particulate matter gradually reduces by approaching the gasifier outlet.

Subzone F shown in FIG. 2 is also denoted as a quench zone. In subzone F, the raw syngas is treated at an average temperature of about 200° C. to 250° C. below the ash softening temperature of the feedstock and at an average temperature lower than in subzone E. By injecting boiler feed water or process condensate at the top of the gasifier, the temperature can be reduced additionally by up to 50° C. in this area. This cooling of the raw gas is sufficient to cool softened ash components, if any, so far that in the gas transition to the cyclone 104 and in the downstream systems there will be essentially no more sticky ash components.

The process and apparatus of the invention will now be described in more detail.

Process for Conversion of Feedstock Comprising Biomass and/or Carbon-Containing Solid Waste Material to Synthesis Gas The process of the present invention for converting feedstock comprising biomass and/or carbon-containing solid waste material to synthesis gas, generally comprises the following steps:

(a) supplying the feedstock to a gasifier, the gasifier comprising a fluidized bed zone and a post-gasification zone;

(b) contacting the feedstock with a gasification agent comprising steam and oxygen in the fluidized bed zone, at an average temperature of between about 350-400° C. below the ash softening temperature of the feedstock, to partially oxidize the feedstock;

(c) contacting at least a portion of the partially oxidized product produced in step (b) with a gasification agent comprising steam and oxygen in the fluidized bed zone, at a higher average temperature than in step (b), the average temperature being between about 250-350° C. below the ash softening temperature of the feedstock;

(d) contacting at least a portion of the product produced in step (c) with a gasification agent comprising steam and oxygen in the post-gasification zone, at a higher average temperature than in step (c), the average temperature being between about 200-300° C. below the ash softening temperature of the feedstock;

(e) contacting at least a portion of the product produced in step (d) with a gasification agent comprising steam and oxygen in the post-gasification zone, at a higher average temperature than in step (d), the average temperature being between about 150-250° C. below the ash softening temperature of the feedstock, to produce the synthesis gas; and (f) recovering the synthesis gas from the product produced in step (e).

As will be understood by a person skilled in the art, unless prohibited explicitly by the wording of the steps, there may be further additional steps performed between steps (a) to (f). As will also be understood, the synthesis gas product in step (e) will usually be in the form of raw synthesis gas (or syngas) and a number of purification steps may need to be performed into order to convert the raw syngas into a quality syngas product which is usable.

Feedstock

The feedstock comprising biomass and/or carbon-containing solid waste material is fed into the fluidized bed zone of the gasifier. The feedstock may be fed to the fluidized bed zone via a lock hopper system and feed screw conveyer at elevated pressures. The feed system (not shown in detail in FIG. 1) may include a series of lock hoppers, star feeders and screw conveyers which are pressurized with $CO_2$. In certain embodiments, the $CO_2$ is separated from the raw syngas during downstream processing in methods known in the art. In certain embodiments, the separated $CO_2$ is reused as a pressurizing agent in the feed system to enable the feeding system to operate at the similar pressure as the gasifier.

Alternatively, any suitable apparatus for feeding the feedstock to the fluidized bed zone of the gasifier can be used.

Any suitable feedstock comprising biomass and/or carbon-containing solid waste material is suitable to be processed in the process of the present invention. In alternative embodiments the feedstock comprises biomass. In an alternative embodiment the feedstock comprises a carbon-containing solid waste material. In some embodiments, the feedstock comprises only biomass, in other embodiments only carbon-containing solid waste material and in further embodiments comprises a blend of biomass and carbon-containing solid waste material.

The process of the present invention is able to process homogenous and heterogeneous feedstocks. In certain embodiments the feedstock is a homogenous feedstock. In other embodiments the feedstock is a heterogeneous feedstock. The term "homogenous feedstock" refers to single-sourced material e.g., trees, agricultural residues, wood chips. "Heterogeneous feedstock" refers to multi-sourced materials e.g., materials such as wood residues from saw-mills, textiles, paper, plastic, cardboard, hydrocarbon compounds and contaminants compounds.

Biomass refers to materials typically classed as biomass i.e., organic matter. Examples of biomass that may be used in the invention are wood and plants. Carbon-containing solid waste material is defined as any form of solid waste which comprises material that is carbon-containing. Examples of carbon-containing solid waste include wastes such as wood waste, agricultural waste, municipal solid waste (MSW), refuse derived fuels (RDF), dried sewage sludge and industrial waste. The above materials may be processed in the invention alone or in combination with one another in a blend. Preferred feedstocks include: RDF, MSW, waste wood (preferably untreated) and hard wood, all of which may be processed alone or in combination with one another. In particular, preferred feedstocks are selected from RDF alone, MSW alone, RDF and MSW blend, RDF with plastic, untreated wood and hard wood. Particularly preferred is the use of an RDF and MSW blend.

Various different feedstocks that comprise biomass and carbon-containing solid waste material, and in various different forms, are suitable feedstocks in the present process. Particularly preferred, however, is the use of a pelletized feedstock. Any suitable pelletizing method known in the art may be used. The pelletized feedstock is preferably pressurized in a pressurisation system prior to being supplied to the gasifier. The use of a pelletized material is not only favourable for gasification processes at elevated pressures but also provides a feedstock with higher bulk density than shredded or non-pelletized material. The use of pelletized flow material facilitates operation at high pressures achieving two main advantages, namely the higher feed density leads to lower $CO_2$ consumption which is advantageous for the process and improving the flowability of the feed material which can be important when using lock hopper gravity system for pressurization. Furthermore, there is a possibility to mix the moderate-to-high carbon content dust, removed from the process with pelletized feedstock, and thereby increasing the overall carbon conversion efficiency of the system. There is a possibility to premix minor amounts of additives including but not limited magnesium compounds to neutralize impurities such as chorine, fluorine and sulphur which are inherently present in pelletized carbon containing material.

Gasification Agent

The gasification agent comprises oxygen and steam. In certain embodiments, the gasification agent further comprises any other suitable gasification agent. In certain embodiments, the gasification agent further comprises air. In certain embodiments the gasification agent further comprises $CO_2$. In certain embodiments, the gasification agent is oxygen and steam i.e., the gasification agent does not comprise any other substantial gas (with the exception of impurities). Preferably, the gasification agent is either oxygen and steam or oxygen, steam and air, most preferably oxygen and steam. In possible alternative embodiments, the gasification agent is air. The gasification agent is fed into the fluidized bed zone of the gasifier using any suitable feeding means.

It is preferred that the gasification agent is introduced into the gasifier via a controlled flowrate, optionally through a single or multilayered nozzle system, as is described in more detail herein.

In some embodiments, the content of the gasification agent and the amount of gasification agent introduced into the gasifier will depend on the quality of the feedstock and its characteristics and properties. In some embodiments, this includes properties of the feedstock such as the fixed carbon content, heating value, ash melting point, and metal content and other impurity levels. In certain embodiments, the content and amount provided should be sufficient to partially oxidize and thermochemically decompose the feedstock to high quality, tar free syngas, as will be understood in the art. Ultimately, in preferred embodiments the gasification agent is selected so as to be sufficient to convert the feedstock to raw syngas.

In certain embodiments, subject to the specific feedstock that is used in the process, the gasification agent is supplied to the gasifier so that the oxygen content in the gasifier is in the controlled range of 0.28-0.52 $Nm^3/kg$ (daf) of the feedstock, of which at least about 20% and not greater than about 80% is supplied to the fluidized bed zone. In further embodiments, the gasification agent is supplied to the gasifier so that the oxygen content in the gasifier is in the controlled range of 0.35-0.45 $Nm^3/kg$ (daf) of the feedstock, of which at least about 35% and not greater than about 65% is supplied to the fluidized bed zone.

daf or DAF=Dry Ash Free content, the weight percentage from the dry and ash free material, is calculated as follows:

$$daf=100/(100-TM-ash)$$

where, TM=total moisture content of the feedstock, ash=ash content in the feedstock. TM is calculated using ISO 18134-1 and ash content using ISO 18122 standard.

In certain embodiments, subject to the specific feedstock that is used in the process, the gasification agent is supplied to the gasifier so that the amount of steam in the gasifier is in the controlled range of 0.23-0.52 $Nm^3/kg$ (daf) of the feedstock, of which at least about 40% and not greater than about 80% is supplied to the fluidized bed zone. In further embodiments, subject to the specific feedstock that is used in the process, the gasification agent is supplied to the gasifier so that the amount of steam in the gasifier is in the controlled range of 0.30-0.45 $Nm^3/kg$ (daf) of the feedstock, of which at least about 50% and not greater than about 70% is supplied to the fluidized bed zone.

Operation of the Gasifier

The gasifier comprises a fluidized bed zone and a post-gasification zone i.e., both zones are present in a single reactor (i.e., gasifier). In certain embodiments, the fluidized bed zone is below the post-gasification zone. A fluidized bed zone takes its usual meaning in the art and in HTW gasification, namely a bed of material in which the properties during operation are such that the material therein behaves as a fluid. In certain embodiments, the bubbling fluidized bed includes internally produced solid remnants of gasified feedstock, termed here as bed material. In general, the bed materials have a particle size ranging from about 200 to about 1600 microns.

The post-gasification zone as used herein also takes its usual meaning in the art and in HTW gasification. In preferred embodiments, the post-gasification zone is a free-board zone.

In certain embodiments the gasifier comprises a conical portion. In certain embodiments, the fluidized bed zone is located within the conical portion and the post-gasification zone is located within the non-conical portion. In certain embodiments, the conical portion is angled between 3 and 12 degrees. Having the fluidized bed zone situated in the conical portion allows nearly constant gas velocity and uniform oxygen supply across the height of fluidized bed with the advantage of controlled process conditions leading to homogeneous bubble formation in the fluidized bed zone which enhances thereby partial oxidation and thermal decomposition of the feedstock.

The operating temperatures of the gasifier are dependent on the ash softening temperature of the feedstock to be gasified. Therefore, in preferred embodiments the ash softening temperature of the feedstock to be gasified is measured prior to operating the gasifier.

"Ash softening temperature" takes its usual meaning in the art, namely the temperature at which particles of ash obtained from the feedstock will begin to deform (i.e., soften) or fuse. Ash softening temperature when referred to herein is measured experimentally using the standard method CEN/TS 15370-1.

The ash softening temperature of some example feedstocks at reducing atmosphere condition are provided below:

| Feedstock type | Ash softening temperature (° C.) |
|---|---|
| Mix of refuse derived fuels (RDF) and municipal solid waste (MSW) | 1178 |
| MSW | 1180 |
| RDF with plastic | 1130 |
| Untreated wood | 1372.5 |
| Hard wood | 1456 |

The above values are taken from particular feedstocks which have been tested. In general, RDF will have an ash softening temperature ranging from 1130 to 1230° C. and typical untreated and hard-wood from 1150 to 1600° C., although impurities therein can result in ash softening temperatures falling outside of these ranges. The temperature ranges are therefore merely provided as approximate ranges.

It has been identified that operating the gasifier at temperatures based on the ash softening temperature of the feedstock results in a highly efficient conversion of the feedstock to synthesis gas. Operating the process within these temperature ranges has been found to advantageously avoid melting the ash in the gasifier and the particles becoming sticky, which can lead to agglomerations that damage the fluidized bed.

The biomass and/or carbon-containing solid waste material feedstock (as discussed in detail earlier) is supplied to the gasifier (by means discussed in detail earlier), preferably in pelletized form. Preferably, the feedstock is supplied to the gasifier in the fluidized bed zone i.e., via an entry point in the fluidized bed zone. In certain embodiments the feedstock is supplied to the gasifier at up to 3 different entry points within the fluidized bed zone. In certain embodiments, there are 3 entry points, in other embodiments 2 entry points and in further embodiments only 1 entry point.

In certain embodiments, the gasification agents are supplied to the gasifier at multiple locations along the gasifier. In certain embodiments, the gasification agent is supplied to both the fluidized bed zone and the post-gasification zone of the gasifier. In certain embodiments, the gasification agent is supplied to the gasifier at approximately 2 to 15 locations along the gasifier, preferably 4 to 10 locations, preferably 5 to 8 locations along with the gasifier.

In certain embodiments, the gasification agent is supplied to the gasifier via a plurality of nozzles. In certain embodiments, each of the nozzles are multilayered. In preferred embodiments, at least one of the nozzles is arranged at an acute angle relative to a horizontal plane of the gasifier. In certain embodiments, the nozzles are tuyeres. More information on the nozzles is provided below in the apparatus section.

In certain embodiments, the gasifier is operated at pressures ranging from about 100 to about 3000 kPa, preferably about 1000 to about 2000 kPa, preferably about 1100 to about 1700 kPa, preferably about 1200 to about 1400 kPa. In certain embodiments, the elevated pressure enables a very high production capacity in a compacted unit. In certain embodiments, the operating pressure in the gasifier is higher than about 1000 kPa. In some embodiments, having an operating pressure higher than about 1000 kPa facilitates the post-treatment and post-processing of the syngas at high pressure resulting in lower capital and operational costs for typical downstream processing of syngas towards advanced fuels such as bio-methanol.

In the process, the feedstock is contacted with a gasification agent comprising steam and oxygen in the gasifier at the following temperatures:

(a) supplying the feedstock to a gasifier, the gasifier comprising a fluidized bed zone and a post-gasification zone (b) between about 350-400° C. below the ash softening temperature of the feedstock to partially oxidize the feedstock in the fluidized bed zone;

(c) then at least a portion of the product of step (b) is treated at a higher temperature, the temperature being between about 250-350° C. below the ash softening temperature of the feedstock, in the fluidized bed zone;

(d) then at least a portion of the product step (c) is treated at a higher temperature, the temperature being between about 200-300° C. below the ash softening temperature of the feedstock, in the post-gasification zone;

(e) then at least a portion of the product of step (d) is treated at a higher temperature, the temperature being between about 150-250° C. below the ash softening temperature of the feedstock in the post-gasification zone.

In certain embodiments, each of the above steps takes place substantially in a different subzones within the gasifier. Subzone referred to in this context refers to a zone within the fluidized bed or post-gasification zones. In certain embodiments, each subsequent step takes place in a subzone located above the subzone of the previous step within the gasifier i.e., each step takes place progressively higher up within the gasifier as the feedstock rises from up the gasifier from the fluidized bed zone to the post-gasification zone until it exits the gasifier. In the gasifier, the temperature generally increases from bottom to top of the gasifier as is usual in the art. It will be understood that there will likely be some overlap in temperatures around the borders of each subzone and hence the use of the term "substantially" above. Similarly, it will be understood that there may be some similar overlap between the fluidized bed and post-gasification zones.

In preferred embodiments, there is at least a 5° C., or 10° C., or 20° C., or 30° C., or 50° C. increase in temperature between each of steps (b) to (e) (i.e., between subzones B to E).

In preferred embodiments, the above temperature or thermal subzones within the gasifier are generated through the controlled addition of the gasification agent. That is to say that in preferred embodiments, no external heat source is used. In contrast, in the preferred embodiments the gasification agent, comprising oxygen and steam, is injected into the gasifier in sufficient form and amount to generate the plurality of thermal subzones. In further preferred embodiments, the gasification agent is injected into the gasifier in a sufficient form and amount to effectively oxidized the feedstock and convert it into the synthesis gas product. In further preferred embodiments, the gasification agent is provided in suitable form and quantity to generate the fluidisation within the fluidized bed zone.

In certain embodiments, operation of the gasifier also comprises a step of cooling at least a portion of the product produced in step (e) to a temperature lower than the temperature in step (e), the temperature being no greater than about 200° C. below the ash softening temperature of the feedstock, wherein this step takes place in the post-gasification zone, e.g. in the upper part of the post-gasification zone. In certain embodiments, the cooling step takes place in a quench subzone of the post-gasification zone and the step of cooling is performed using quench water or process condensate. In preferred embodiments the cooling step takes place in a subzone above step (d) in the post-gasification zone. In preferred embodiments, the cooling step takes place at the top of the post-gasification zone and at the top of the gasifier. In preferred embodiments, the quench water or process condensate is injected using a nozzle, preferably wherein the nozzle is located within the quench subzone. In certain embodiments, the temperature in this step is 200 to 300° C. below the ash softening temperature of the feedstock, preferably 200 to 250° C. below the ash softening temperature of the feedstock. In preferred embodiments, the subzone is cooled through the addition of the quench water or process condensate, preferably wherein no further additional external cooling source is used.

In certain embodiments, the process further comprises a further step of removing at least a portion of a bottom product, such as a heavy solid residue, produced in step (b) to a sedimentation subzone in the fluidized bed zone. In certain embodiments, the process further comprises treating the bottom product in the sedimentation subzone with a gasification agent comprising steam and/or $CO_2$. In preferred embodiments, the gasification agent comprises steam, in further preferred embodiments the gasification agent is steam and/or $CO_2$. In certain embodiments, the treatment is carried out at a temperature lower than the temperature in step (b), the temperature being not greater than about 400° C. below the ash softening temperature of the feedstock. In preferred embodiments, the temperature is between about 400° C. to 500° C. below the ash softening temperature of the feedstock. In preferred embodiments, this step takes place in a subzone below the subzone of step (b). In preferred embodiments, this step takes place at the bottom of the fluidized bed zone and at the bottom of the gasifier. In preferred embodiments, the gasification agent is injected into this subzone in a form and quantity (in a controlled manner) to generate the temperature and the required fluidisation within this subzone i.e., no other external heat source is used.

In preferred embodiments, the process comprises the quenching step (i.e., quenching subzone or subzone A) and bottom product removal step (i.e., sedimentation subzone or subzone F) in addition to steps (b) to (e) (i.e., subzones B to E). In this preferred embodiment the gasifier comprises six thermal subzones, three within the fluidized bed zone and three within the post-gasification zone.

It will be understood by the person skilled in the art that in preferred embodiments the temperature ranges referred to in the above paragraphs in relation to the steps and/or subzones which take place within the gasifier relate to average temperatures within each step and/or subzone and that the temperature may actually be higher and/or lower in certain parts of each step and/or subzone. The use of the term "average temperature" herein takes it usual meaning within the art and refers to the average temperature of each step and/or subzone and it will be understood that within each step and/or subzone there higher/lower temperatures than the average will likely be present. The "average temperature" can be determined in accordance with methods known to the skilled person. In particular, an average temperature can be determined by placing multiple thermocouples at different locations within a subzone in the gasifier for measuring the individual temperatures at said locations. In this measurement setup, the average temperature is the mean temperature of the individual temperatures (usually the instant gas temperatures) measured by said thermocouples (by their thermoelements) at said different locations in said subzone of the gasifier over a certain time period. In particular, if the average temperature remains constant the process conditions are considered stable.

For the avoidance of doubt, in alternative embodiments the temperature ranges expressed herein may refer to absolute temperature ranges rather than average temperature ranges.

In certain embodiments, the particulate matter has a residence time in the fluidized bed zone of at least about 8 minutes. Preferably, the residence time is about 8 minutes to about 90 minutes, preferably about 15 minutes to about 75 minutes, preferably about 25 minutes to about 60 minutes, preferably about 35 minutes to about 45 minutes. As used herein, the term "residence time of particulate matter in the fluidized bed zone" may be understood as the time period from an entry of a solid material into the fluidized bed to the time point said solid material leaves the fluidized bed from the bottom of the gasifier as a bottom product. Said residence time can be measured by method well-known to the skilled person.

In certain embodiments, the raw synthesis gas in has a residence time in the post-gasification zone of at least about 7 seconds, preferably at least about 10 seconds, preferably at least about 12 seconds, preferably at least about 15 seconds. Preferably the residence time in the post-gasification zone is no greater than about 20 seconds, preferably no greater than about 15, preferably no greater than about 10 seconds. The higher residence times in the post-gasification zone help to improve the thermal decomposition of the heavier hydrocarbons, thus helping to reduce the amount of tar present in the syngas product. In particular, the term "residence time of raw synthesis gas in the post gasification zone" may be understood as the time period from the entry of a raw synthesis gas molecule, produced in the fluidized bed, into the post gasification zone until the exit of the raw synthesis gas molecule from the post-gasification zone. Said residence time can be determined by common methods known to the skilled person.

In preferred embodiments, an external catalyst is not added into the system i.e., the gasifier is operated absent the addition of external (or fresh) catalyst. This means that no external catalyst is specifically added into the gasifier during operation. Instead, in the preferred embodiment, the ash material within the feedstock is essentially used as the catalyst. In this respect, the bottom product of the present process typically contains both ash and carbon and the ash contains a lot of different materials such as aluminum, iron, nickel, etc. which act as the catalyst. As is explained herein, it is particularly advantageous not to have to handle and add an external catalyst into the process.

Recovery of the Synthesis Gas

After the raw syngas has been produced in the gasifier, it is recovered from the process.

During this recovery of the synthesis gas, the raw syngas can be treated and/or processed in accordance with any suitable treatment/processes known in the art to refine raw syngas. These treatments typically involve removing impurities and undesired material from the raw syngas.

Such processes include, but are not limited to:
- treatment in a cyclone to remove entrained dust which is optionally recycled, in particular directly recycled, back to the fluidized bed zone of the gasifier;
- treatment in at least one raw gas cooler, wherein saturated steam is optionally produced and recycled to the fluidized bed zone of the gasifier;
- treatment in a fly-char (dry basis) removal unit; and/or
- treatment in a quench and scrubbing unit.

After recovering the syngas, the treated tar-free syngas can be further processed into an appropriate feedstock for production of various useful products such as advanced/biofuels, by processes known to those skilled in the art. Such processes can offer tar-free syngas as an appropriate feedstock to produce high valuable materials, such as methanol, synthetic natural gas and/or Fischer-Tropsch synthesis fuels.

Apparatus for Conversion of Feedstock Comprising Biomass and/or Carbon-Containing Solid Waste Material to Synthesis Gas A schematic example of the layout of the apparatus for performing the invention is shown in FIG. 1.

The apparatus may generally comprise any of the components and units shown in FIG. 1 and as described earlier on. The apparatus may also comprise any alternative components and units not shown in FIG. 1 but known to be used in gasification processes. In particular, the apparatus of the invention may contain any components and units suitable for performing the process of the invention.

In particular, the apparatus may comprise means for supplying the feedstock to the gasifier and the gasifier itself may comprise at least one entry point for the feedstock, preferably 1 to 3 entry points for the feedstock. The apparatus may also comprise any means suitable for recovering the syngas downstream of the gasifier.

As discussed earlier in the description, in certain embodiments the gasifier, which includes a fluidized bed zone and a post-gasification zone, has a conical portion in which the fluidized bed zone is located, although the gasifier may take any suitable gasifier shape and/or form. In certain embodiments, the gasifier is a refractory lined gasifier.

In an aspect of the invention, the gasifier includes a plurality of nozzles within the gasifier. The nozzles are configured to introduce the gasification agents into the gasifier. In particular, the nozzles are configured to supply in use the gasification agent so as to generate both the required fluidisation inside the fluidized bed zone and the plurality of operating temperatures within the fluidized bed and post-gasification zones of the gasifier. In alternative embodiments, the nozzles may be configured for other purposes. In further alternative embodiments, the nozzles are configured to supply in use the gasification agent so as to generate the plurality of operating temperatures within the fluidized bed and post-gasification zones of the gasifier i.e., the plurality of temperature subzones or steps discussed earlier.

In preferred embodiments at least one of the nozzles is arranged on the side of the gasifier, although it is also possible for the nozzles to be located at the base/bottom of the gasifier. A combination of nozzles located at the bottom of the gasifier and at the sides of the gasifier is also possible. In the fluidized bed zone, it is preferred that the nozzles are located at the sides of the gasifier. In preferred embodiments, a plurality of nozzles are located along the sides of the gasifier, preferably within both the fluidized bed and post-gasification zone.

In preferred embodiments, at least one nozzle, in particular one nozzle, is configured to supply a gasification agent, such as oxygen, to the post-gasification zone of the gasifier and is arranged in a first subzone of said post-gasification zone in which in step (c) of the process according to the present invention is carried out, i.e. in subzone D, wherein this subzone is located above, optionally directly above, the fluidized bed zone. Thus, said at least one nozzle arranged in the first subzone is configured to supply gasification agent, such as oxygen, for providing an average temperature being between about 200-300° C. below the ash softening temperature of the feedstock and higher than in the fluidized be zone within this first subzone. Preferably, an outlet of said at least one nozzle is directed downwards to the bottom of the reactor. The term "above" when used herein in context with the gasifier refers to a relative position closer to the top of the gasifier.

In preferred embodiments, at least one nozzle, in particular one nozzle, is configured to supply gasification agent, such as oxygen, to the post gasification zone of the gasifier and is arranged in a second subzone located above, in particular directly above, the above-mentioned first subzone in which in step (c) of the process according to the present invention is carried out. Said at least one nozzle is arranged in the second subzone where step (d) of the process of the present invention is carried out, i.e. in subzone E. Thus, said at least one nozzle arranged in subzone E is configured to supply gasification agent, such as oxygen, for providing the average temperature being between about 150 to 250° C. below the ash softening temperature of the feedstock and higher than in the first subzone. Preferably, an outlet of said at least one nozzle is directed upwards to the top of the gasifier, i.e. away from the bottom of the gasifier.

In preferred embodiments, the nozzles are located at multiple locations along the gasifier. In further preferred embodiments, the gasification agents are injected through the nozzles to both the fluidized bed zone and the post-gasification zone of the gasifier. In certain embodiments, the gasification agent is supplied to the gasifier at approximately 2 to 15 locations along the gasifier, preferably 4 to 10 locations, most preferably 5 to 8 locations along with the gasifier.

As a person skilled in the art will understand, any arrangement of nozzles is possible that is capable of injecting the gasification agents such that the plurality of temperature steps/subzones and fluidization as required by the process of the invention is generated.

Any nozzle suitable for supplying the gasification agents to the gasifier may be used in the apparatus. Preferably the nozzles are injection nozzles, preferably tuyeres. In certain embodiments, the nozzles may be described as lances.

In a preferred embodiment, each nozzle is a multi-layered nozzle. In certain preferred embodiments, the nozzle is multi-layered as described in EP 2885381 A1. In this document multi-layered nozzles are described which have at least three mutually coaxial pipes, each of which delimits at least one annular gap. The outermost pipe is designed to conduct superheated steam and has a steam supply point, the central pipe is designed as an annular gap, and the innermost pipe is designed to conduct oxygen at a temperature of no higher than 180° C. and has an oxygen supply point. A temperature sensor is arranged within the innermost pipe, said temperature sensor extending to just in front of the opening of the innermost pipe. The innermost pipe tapers in the form of a nozzle before opening; the innermost pipe opens into the central pipe; and the opening of the central pipe protrudes further relative to the opening of the outermost pipe. Thus the nozzles have a "multilayer" structure i.e., a plurality of pipes arranged coaxially to one another.

At least one of the nozzles is arranged at an acute angle relative to a horizontal plane of the gasifier i.e., it is set at an angle relative to or away from both the horizontal plane. The term "acute angle" used herein takes its normal meaning which is less than 90 degrees and more than 0 degrees. The horizontal planes are defined in the normal manner in relation to a gasifier, namely the planes perpendicular to the vertical axis of the gasifier (the vertical axis being that defined from the bottom to the top of the gasifier).

In essence, the at least one nozzle is configured at an angle orientated away from a horizontal plane of the gasifier (at an angle above or below relative to the horizontal plane are both possible). In preferred embodiments, the at least one nozzle may also be arranged at an acute angle relative to a vertical plane or axis of the gasifier. In preferred embodiments, the nozzle is arranged at an angle between 5 to 85 degrees relative to the horizontal plane, more preferred at an angle between 10 to 80 degrees relative to the horizontal plane or between 20 to 60 degrees relative to the horizontal plane.

In certain embodiments, more than one of the nozzles are arranged at an acute angle relative to a horizontal plane of the gasifier. In certain embodiments, all of the nozzles are arranged at an acute angle relative to the horizontal plane i.e., all of the nozzles are configured at an angle.

It has been found that arranging the nozzles at an angle relative to the horizontal plane of the gasifier, as well in certain embodiments using the preferred nozzle arrangements and multilayer configuration, enhances localized transport and reaction mechanisms along the gasifier. This owes to the gasification agent being introduced at an acute angle relative to the horizontal plane of the gasifier.

In particular, the angle of the nozzles provides advantages in relation to the flame (jet). Whenever oxygen (i.e., the gasification agent) is injected into the gasifier, there is a flame observed at the outlet of the injection nozzle. The length of the flame should not exceed the inner radius (half of the inner diameter) of the gasifier vessel. This is to avoid any kind of contact between the flame tip from the injection nozzle and a lining of the gasifier such as a refractory lining (on the other side). Therefore, the nozzles of the invention are able to have longer flame lengths which help to enhance the cracking of high molecular weight hydrocarbons such as naphthalene—as compared with typical nozzles which are arranged in a horizontal plane of the gasifier and typically inject the gasification agent along a substantially horizontal plane into the gasifier. Naphthalene is undesirable in the product synthesis gas and thus the quality of the synthesis gas product is improved.

Certain tests have also been carried out using the present process and apparatus.

Successful tests have been conducted based on the process and apparatus described herein. The feedstocks tested were included the following: i) waste wood pellet (WW), ii) 75% RDF/25% WW, iii) 50% RDF/50% WW, (iv) 25% RDF/75% WW and v) 100% RDF. The tests showed efficient conversion of the feedstock to synthesis gas, with a carbon conversion efficiency (CCE) of approximately 93-95% (wherein CCE represents the percentage of total carbon in the gasifier feedstock which is successfully converted to product gases, which contain carbon (such as CO, $CO_2$, $CH_4$, $C_2H_2$, $C_2H_4$, $C_2H_6$, $C_6H_6$ and $C_{10}H_8$). In addition, high yields of CO and $H_2$ in the range of 950-1200 $Nm^3$/ton of dry and ash-free (daf) feedstock are achieved. The $CH_4$ content in the synthesis gas on a dry basis is below 8 mol.-% which is indicative for the quality of the synthesis gas. On the contrary, conventional processes (using comparable feed flow rates and comparable feedstock) and not being carried out with a temperature profile (such as shown in FIG. 2) and residence times in the gasifier according to the invention, provide a lower carbon conversion of below 90%, a yield of CO and $H_2$ below 800 $Nm^3$/ton of daf feedstock and the $CH_4$ content in the synthesis gas on a dry basis is above 12 mol.-%. The latter value is an indicator that tars are also present in the raw synthesis gas of such conventional processes.

The order of the steps of the processes described herein is exemplary (unless a certain order is necessitated through the explicit wording of the steps), but the steps may be carried out in any suitable order, or simultaneously where appropriate. Additionally, steps may be added or substituted in, or individual steps may be deleted from any of the processes without departing from the scope of the subject matter described herein.

It will be understood that the description of preferred embodiments herein is given by way of example only and that various modifications may be made by those skilled in the art. What has been described above includes examples of one or more embodiments. It is, of course, not possible to describe every conceivable modification and alteration of the above process and apparatus for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims.

The invention claimed is:

1. A process for converting feedstock to synthesis gas, the process comprising the following steps:
    (a) supplying the feedstock, the feedstock comprising biomass and/or carbon-containing solid waste material, to a gasifier, the gasifier comprising a fluidized bed zone and a post-gasification zone;

(b) contacting the feedstock with a gasification agent comprising steam and oxygen in the fluidized bed zone, at an average temperature of between about 350-400° C. below the ash softening temperature of the feedstock, to partially oxidize the feedstock;

(c) contacting at least a portion of the partially oxidized product produced in step (b) with a gasification agent comprising steam and oxygen in the fluidized bed zone, at a higher average temperature than in step (b), the average temperature being between about 250-350° C. below the ash softening temperature of the feedstock;

(d) contacting at least a portion of the product produced in step (c) with a gasification agent comprising steam and oxygen in the post-gasification zone, at a higher average temperature than in step (c), the average temperature being between about 200-300° C. below the ash softening temperature of the feedstock;

(e) contacting at least a portion of the product produced in step (d) with a gasification agent comprising steam and oxygen in the post-gasification zone, at a higher average temperature than in step (d), the average temperature being between about 150-250° C. below the ash softening temperature of the feedstock, to produce the synthesis gas; and (f) recovering the synthesis gas from the product produced in step (e).

2. The process of claim 1, wherein the process further comprises a step of cooling at least a portion of the product produced in step (e) to an average temperature lower than in step (e), the average temperature being no greater than about 200° C. below the ash softening temperature of the carbonaceous feedstock, wherein this step takes place in the post-gasification zone.

3. The process of claim 2, wherein the cooling step takes place in a quench subzone of the post-gasification zone and the step of cooling is performed using quench water or process condensate.

4. The process of claim 1, further comprising a step of removing at least a portion of a bottom product, optionally a heavy solid residue, produced in step (b) to a sedimentation subzone in the fluidized bed zone.

5. The process of claim 4, further comprising treating the bottom product in the sedimentation subzone with a gasification agent comprising steam and/or $CO_2$, optionally wherein the treatment is carried out at an average temperature lower than in step (b), the average temperature being not greater than about 400° C. below the ash softening temperature of the feedstock.

6. The process of claim 1, wherein step (f) comprises feeding at least a portion of the synthesis gas to a cyclone and separating the produced synthesis gas from entrained particulate material, optionally fly-ash or char, and recycling at least a portion of the particulate material back to step (b) in the fluidized bed zone.

7. The process of claim 1, wherein a residence time of raw synthesis gas in the post-gasification zone is at least about 7 seconds.

8. The process of claim 1, wherein the process comprises providing the gasification agents through a plurality of nozzles, optionally tuyeres, wherein at least one of the nozzles is arranged at an acute angle relative to a horizontal plane of the gasifier.

9. The process of claim 1, further comprising operating the gasifier at a pressure of about 1000 kPa to 3000 kPa, optionally wherein the gasifier is a refractory lined reactor.

10. The process of claim 1, further comprising operating the gasifier without adding external catalyst.

11. The process of claim 1, further comprising supplying the gasification agent to the gasifier so that the oxygen content in the gasifier is in the controlled range of 0.28-0.52 $Nm^3/kg$ (daf) of the feedstock, of which at least about 20% and not greater than about 80% is supplied to the fluidized bed zone and so that the amount of steam in the gasifier is in the controlled range of 0.23-0.52 $Nm^3/kg$ (daf) of the feedstock, of which at least about 40% and not greater than about 80% is supplied to the fluidized bed zone.

12. The process of claim 1, wherein the supplied feedstock is a pelletized feedstock, optionally further comprising pressurizing the pelletized feedstock in a pressurisation system prior to supplying the feedstock to the fluidized bed zone in step (b).

13. The process of claim 1, wherein the post-gasification zone is arranged in the gasifier above the fluidized bed zone, wherein the fluidized bed zone is in a conical portion of the gasifier.

14. The process of claim 1, further comprising performing each of steps (b) to (e) in substantially separate subzones within the gasifier.

\* \* \* \* \*